May 9, 1967  E. P. PRZYBYLOWICZ ET AL  3,318,451
THIN-LAYER CHROMATOGRAPHIC CHAMBER AND SUPPORT DEVICE
Filed June 14, 1965
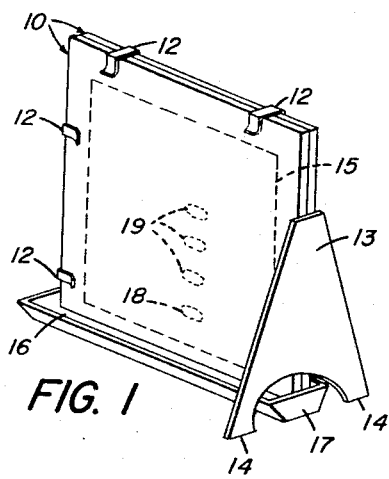
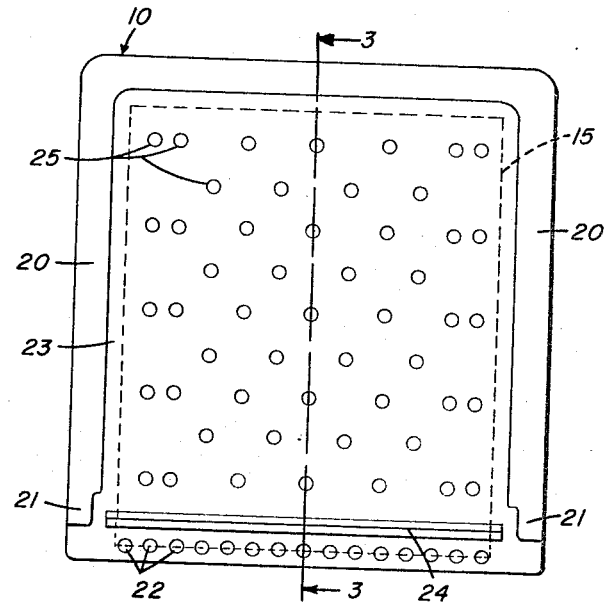
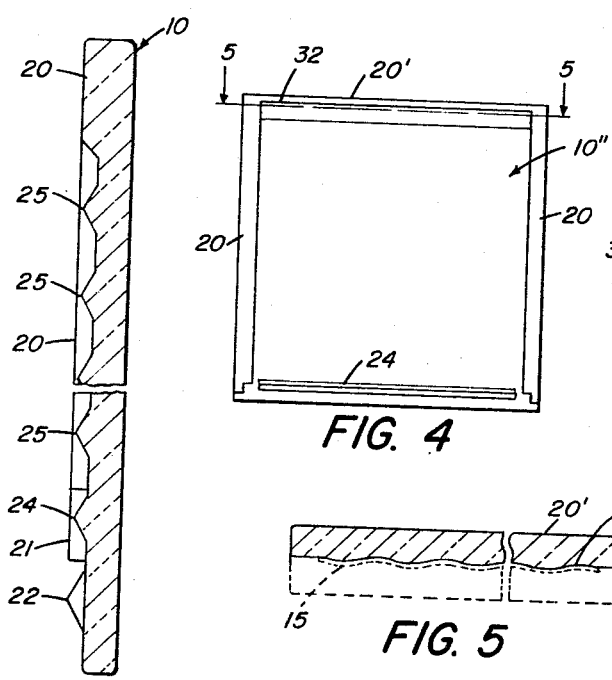
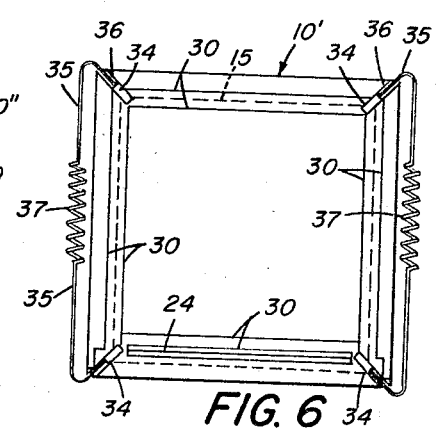
EDWIN P. PRZYBYLOWICZ
ALBERT D. BAITSHOLTS
INVENTORS
BY R. Frank Smith
David P. Ogden
ATTORNEYS

# United States Patent Office 3,318,451
Patented May 9, 1967

3,318,451
THIN-LAYER CHROMATOGRAPHIC CHAMBER AND SUPPORT DEVICE
Edwin P. Przybylowicz and Albert D. Baitsholts, Rochester, N.Y., assignors to Eastman Kodak Company, Rochester, N.Y., a corporation of New Jersey
Filed June 14, 1965, Ser. No. 463,735
13 Claims. (Cl. 210—198)

This invention relates to a chamber for use with thin-layer chromatographic elements and more particularly to apparatus for securing a flexible thin-layer chromatographic sheet accurately within a prescribed essentially air-tight volume.

Thin-layer chromatography works on a principle somewhat similar to wicking action wherein a liquid solvent rises in an adsorbent sheet or layer with various substances placed thereon rising differing amounts therewith to provide a "pattern" which may be visually analyzed. Such chromatography involves a chromatographic element comprised of an inert support, such as glass, with a thin-layer of adsorbent secured thereto. When using such elements, it is difficult to make them in a laboratory, and primarily because of the glass, such elements are heavy and expensive to purchase. In a recent advantageous embodiment of chromatographic elements, or sheets, the inert support is fabricated of a flexible material such as polyester film, instead of glass. However, such lightweight flexible elements require a special fixture for their accurate support.

As will become apparent, by an understanding of several known chromatographic principles, it is essential that the elements be supported properly. For instance, separations utilizing thin-layer chromatographic elements are accomplished by placing mixtures of materials to be tested on the lower portion of an element and thereafter mounting the element vertically, or substantially so, in an eluant solvent. The eluant solvent wets the adsorbent layer by advancing upward from the dipped edge toward the opposite edge of the element. As the eluant solvent advances, it acts as a vehicle for the several constituents of the mixture being separated.

Varying affinities of the several constituent materials for the adsorbent produces one of the more important chromatographic separatory influences. Materials having less affinity for the adsorbent are carried along by the eluant solvent more easily and at a greater rate than materials having greater affinity for the adsorbent. Materials having greater affinity for the adsorbent also displace materials having lesser such affinities from adsorption sites which additionally causes the latter to be more readily carried along by the eluant solvent. This tends to develop spots of each of the materials at predetermined levels above the original mixture placement on the element. Other factors may also contribute to a given chromatographic separation, but the importance of eluant solvent travel is predominant.

Certain problems exist concerning the eluant solvent vehicular support of the material in thin-layer chromatographic elements. First it is imperative that the eluant solvent travels in one direction (usually up) through the adsorbent layers. However, if a surface, such as a support surface, is placed closely adjacent the chromatographic element, the eluant solvent will tend to wet both the chromatographic element and adjacent surface thereby filling the volume between with eluant solvent by capillary action. Such flooding of the chromatographic element is extremely detrimental to, if not completely destructive of, useful material determinations, as the unidirectional vehicular action is completely frustrated by the flooding. Therefore, supports must not cause capillary fluid flow.

Flexible thin-layer chromatographic elements present a problem in that the elements are not rigid and generally require a supporting structure effective to prevent bowing of the element in either lateral direction.

Another problem of supporting thin-layer chromatographic elements, and particularly flexible elements, concerns the evaporation of eluant solvents as it advances through the thin adsorbent layer. Obviously the wetted area increases as the eluant solvent front advances. Increased area gives rise to increased evaporation of the eluant solvent. It will be recognized that at an extreme degree of eluant solvent frontal advance, the wetted area will be such that the eluant solvent evaporation just equals the amount entering the adsorption layer at the dipped edge of the element. At this point the frontal advance of the eluant solvent ceases and the chromatographic separation is completed.

However, if unrestricted evaporation is allowed, the several materials of a mixture will all eventually be raised to the frontal advance of the eluant solvent. Thus resolution of the separation is greatly impaired if not destroyed. One means of overcoming these adverse effects of eluant solvent evaporation is to enclose the chromatographic element in a volume saturated with the vapor of the eluant solvent. A known means of simplifying this problem is by providing only a very small vapor volume around the chromatographic element during separation development. If the volume is small enough, only a minute amount of eluant solvent need be evaporated before desired saturation is reached.

When thin-layer elements are rigid, a small volume is relatively simple to construct—even with the above problems in mind. However, a flexible thin-layer chromatographic element has proved very difficult to develop while being closely confined and yet without full support and without flooding as by capillary action. The element naturally bends and otherwise tends to defeat attempts to preserve uniform and adequate spacing so as to preclude flooding while at the same time holding the total enclosed volume to such low magnitude as will allow rapid saturation with eluant solvent vapor. Moreover, the thin volume results in substantial percentage volume variations with slight bowing of the element. Such spacial variations cause corresponding variations in the solvent advance to cause substantial variations in separations developed.

Therefore, it is an object of the invention to provide apparatus for the development of flexible thin-layer chromatographic elements while confined in a small, air-tight volume.

Another object of the present invention is to provide apparatus which will permit development of flexible thin-layer chromatographic elements without flooding.

A further object of the present invention is to provide apparatus for the development of flexible thin-layer chromatographic elements without the necessity of long purge to establish equilibrium.

In accordance with one embodiment of our invention, a thin-layer chromatographic element support means utilizes a pair of closely spaced glass plates. The glass plates have means for supporting the element suspended midway between the closely spaced glass layers bounding a small solvent vapor chamber. The small thin volume is enclosed by the glass on five sides so that the sixth side (the bottom edge) may be dipped in an eluant solvent. The support plates are also provided with a flood bar adjacent to the open side which establishes the upper extremity of the flooding action of the solvent whereby solvent rising above this bar will travel only through the adsorbent containing constituent samples thereon.

The subject matter which is regarded as our invention is particularly pointed out and distinctly claimed in the concluding portion of this specification. The invention, however, as to its organization and operation, together with further objects and advantages, will best be understood by reference to the following description taken in connection with the accompanying drawing, in which:

FIG. 1 is a perspective view of the assembled chromatographic element support having two side plates;

FIG. 2 is a plan view of one form of one of the support plates shown in FIG. 1;

FIG. 3 is a section view of a plate taken along the line 3—3 of FIG. 2;

FIG. 4 illustrates another embodiment of the present invention;

FIG. 5 is a section view taken along the line 5—5 of FIG. 4; and

FIG. 6 is a further embodiment of this invention.

Referring now to the drawing, wherein like numbers indicate equal similar parts, the chromatographic development containment structure illustrated in FIG. 1 is provided with a pair of identical closure side support plates 10 of glass or an equivalent solvent-resistant plastic clamped together by a plurality of clamps 12. At least two of the clamps 12 are secured to an upright support member 13 having laterally spaced feet 14. The support plates 10 when clamped together form a sandwich as indicated in FIG. 1 to enclose two sides and three edges of a chromatographic element 15 (shown in dashed lines) with the fourth edge, referred to hereinafter as the bottom, being pneumatically sealed by an eluant solvent 16 in a tray 17. Chromatographic development structures are also known wherein the edges of the plates 10 are treated as by grinding, to form a seal which is effective even without clamps 12, if the plates are supported at an angle, as by a rack (not shown).

The chromatographic element 15 being supported by the plates 10 is a flexible element having a base layer of polyester film material or the like. On one surface of the base layer is an adsorbent whereby mixtures spotted thereon, as at 18, will be subjected to chromatographic development in the apparatus shown to provide constituent material separation, as at 19. The use of sandwich construction as opposed to unitary construction greatly simplifies loading and cleaning of the apparatus for reuse. Although a gasket may be positioned between the plates 10 to seal the three edges, it is not usually required.

As shown more clearly in FIG. 2, each plate 10 is effectively dished-out by being provided with a peripheral flange 20 on three sides whereby the pair of plates define five sides of a cavity having major lateral and vertical dimensions slightly greater than those of the element 15 such as eight by eight inches and a thickness of the order of .120 inch or 1/8 inch. The mating surfaces of the flanges 20 should be ground smooth to provide a good air seal therebetween. Because of the capillary flooding considerations the flanges 20 are recessed to prevent element contact by providing narrower lower portions 21 which will not engage the element 15 below the solvent surface.

For vertical support, the element 15 (indicated in phantom FIG. 2) rests on a plurality of lower protrusions 22 which extend from the dished-out plate surface 23 the same distance as the flanges 20 whereby the mating plates cause the protrusions 22 to engage so as to support the element 15. A flood bar 24 is positioned above the protrusions 22 and establishes the upper extremity of the liquid flooding level.

In accordance with one embodiment of our invention, throughout the area of the recessed or dished-out portion of the plate 10 are provided other protrusions 25 which extend from the plate surface layer 23 a distance slightly less than the flanges 20 to thereby support the element 15 without necessity of substantial contact on the plate 10 itself. These protrusions are of less height than the flanges 20 by an amount approximately equal to one-half the thickness of the element 15 so that the element is supported mid-way between the plate surface layers 23.

Referring now to FIG. 3, a cross section view of the plate 10 is shown to illustrate the upper flanges 20, the protrusions 22, the flood bar 24 and the protrusions 25. Although the protrusions may be separately fabricated and pasted on or otherwise supported by the surfaces 23, in this embodiment they are formed as a portion of the plate material. However, the protrusions 25 can also be fabricated from an inert insert of a material such as Teflon. It is apparent that the protrusions all come to a point so as to prevent localized flooding therearound. Also, they are tapered from this point at a low angle such that they will not tend to puncture the element 15. Thus the protrusions assume a low conical shape. In one embodiment of this invention the flanges 20 extend above the glass layer 23 about .060 inch as do the lower protrusions 22. The flood bar 24 and the lateral support protrusions 25 extend from the glass layer 23 only about .048 to .053 inch whereby an element 15 of about .014 may be supported between two identical glass plates 10.

The protrusions 25 may also be replaced by lateral support bars similar to that shown at 24. However, such construction requires very precise fabrications so that the bars come to a carefully spaced pointed tip (of a height of .048 to .053 without grinding). Moreover, the glass plate supporting the back of the element 15 may be of a somewhat different construction without individual plural protrusions 25 over the layer 23. When using a single backer plate 10' construction (FIG. 6), it is only necessary to provide antiflood channels 30 completely around the area of the back of the element 15. Care should be taken to provide a horizontal channel 30 above the flood bar 24. This construction (10') has the slight disadvantage that narrow strips of the element 15 will tend to flood. On the other hand, when using the pair of similar plates 10, the elements 15 may be cut and used in a narrow vertical strip form.

Referring now to FIGS. 4 and 5, we have shown a somewhat different support means for the element 15 wherein the plates 10'' define a serpentine slot 32 at the top of the apparatus and forming a portion of the upper flange 20'. This slot 32 is designed to tightly engage the top of the element 15 so as to cause it to assume a slightly corrugated configuration. These corrugations, even when only a few thousandths of an inch in depth, will (along with the flood bar 24) maintain the element 15 vertically suspended without engagement of the glass layers 23. Also the serpentine shape (32), as indicated in FIG. 4, does not extend to the outer extremity of the upper flange 20'. When using this support system, the layers 23 may be provided with a corresponding serpentine shape and the protrusions 22 may be omitted. Again care must be taken not to cause excessive corrugation of the element as the solvent rate of rise in a trough of a corrugation will be different from that of a "hill" if the surfaces are not correspondingly corrugated. Apparently, this phenomena is caused by the above described evaporation problem.

Referring again to FIG. 6, a somewhat different suspension system is shown using spring-biased clamps 34 at the four corners of the element 15. When using such clamps, we prefer to place an inert grease at the upper corners to assure an adequate seal where the wires 35 extend through slots 36 of the glass plates 10' to springs 37. In fact, such grease may be used, as required, to improve the seal of all plates 10, 10' and 10''. However, care must be used in selecting a grease which will not influence the chromatographic separations as by changing the vehicular properties of the solvent 16 or the porosity of the active part of the absorbent layer.

While we have shown a particular embodiment of this invention, modifications thereof will occur to those skilled in this art. We intend, therefore, to have the appended claims cover such embodiments as properly fall within the scope of the present invention.

We claim:
1. A flexible chromatographic element chamber and support device comprising:
   a tray for containing an eluant solvent;
   a pair of support plates having inner surface layers and raised mating edges for sealing the element in a thin volume open along one edge;
   means for supporting said plates with the open edge in said tray while maintaining said mating edges in engagement; and
   means co-operating with said plates for supporting said element therebetween so that at least the major portion of its adsorbent surface does not engage either of said layers thereby preventing flooding thereof.

2. A flexible chromatographic element support device as in claim 1 wherein said plates define a floor bar adjacent to the open edge for limiting the level of flooding by the solvent.

3. A flexible chromatographic element support device as in claim 1 wherein said supporting means comprises a plurality of clamps spring-biased to support the element in tension from its corners.

4. A flexible chromatographic element support device as in claim 1 wherein said last named supporting means comprises a plurality of spaced-apart protrusions for engaging at least the absorbent surface of the element, said protrusions spaced above the flood level of the solvent.

5. A flexible chromatographic element support device as in claim 4 wherein said protrusions are an integral part of at least one of said plates.

6. A flexible chromatographic element support device as in claim 4 wherein said protrusions engagingly support both surfaces of the element.

7. A flexible chromatographic element support device as in claim 6 wherein said protrusions on the two plates are directly opposed to matingly engage the opposed surfaces of the element.

8. A flexible chromatographic element support device as in claim 1 wherein said last named supporting means forms a part of the mating edge opposed to the open edge which part clamps the upper edge of the element.

9. A flexible chromatographic element support device as in claim 8 wherein said part is of a serpentine shape causing at least the upper portion of the element to assume a corrugated shape whereby it is suspended between the layers.

10. A flexible chromatographic element support device, comprising:
    a tray for containing an eluant solvent;
    a pair of support plates having inner dished-out layers and three flanges at the mating edges for sealing the element in a thin volume open along one edge;
    a clamping means for said plates;
    means for maintaining the open surface of the volume defined by said plates with said open edge in said tray, each of the flanges of said plates adjacent to the open edge being recessed to prevent flooding the edges of the element;
    a flood bar on each of said plates for establishing the maximum flood level of the solvent;
    means coupled to said plates for supporting said element between the dished-out layers so that at least its adsorbent surface does not engage either of said layers thereby preventing flooding thereof, and means coupled to said plates between said flood bars and the open edge for supporting the element.

11. A flexible chromatographic element support device as in claim 10 wherein said supporting means comprises a plurality of spaced-apart protrusions for engaging opposite sides of the element, said protrusions being of a thickness relative to that of the flanges to allow support of the element therebetween and being of a low conical shape to prevent localized flooding.

12. A flexible chromatographic element chamber and support device comprising:
    a tray for containing an eluant solvent;
    a pair of parallel support plates;
    means co-operating with three edges of said plates to maintain them in a parallel spaced relation to thus define a thin chromatographic chamber, closed on five sides;
    means for supporting said plates with the open side of the chamber in said tray; and
    means for supporting the flexible element in said chamber so that all portions of the adsorbent surface thereof which are subject to separation development are substantially equidistant from the opposing surface layer of said pair of plates.

13. A flexible chromatographic element chamber and support device as in claim 12 wherein said last named means comprises a plurality of protrusions extending from said opposing surface layer toward said adsorbent surface, and each of said protrusions having a cross section terminating at a point.

References Cited by the Examiner

UNITED STATES PATENTS 3,067,132 12/1962 Gunew _____ 210—198 X
3,189,541 6/1965 Brenner et al. _____ 210—31 X

OTHER REFERENCES

Journal of Chromatography and Chromatographic Data, vol. 10, 1963, pages 518–521.

REUBEN FRIEDMAN, *Primary Examiner.*

J. DE CESARE, *Assistant Examiner.*